United States Patent
Byun et al.

(10) Patent No.: US 11,503,516 B2
(45) Date of Patent: Nov. 15, 2022

(54) METHOD AND APPARATUS FOR PROVIDING BEAM RELATED INFORMATION FOR CONNECTION FAILURE DETECTION IN WIRELESS COMMUNICATION SYSTEM

(71) Applicant: LG ELECTRONICS INC., Seoul (KR)

(72) Inventors: Daewook Byun, Seoul (KR); Hongsuk Kim, Seoul (KR); Jian Xu, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/053,305

(22) PCT Filed: Jun. 20, 2019

(86) PCT No.: PCT/KR2019/007428
§ 371 (c)(1),
(2) Date: Nov. 5, 2020

(87) PCT Pub. No.: WO2019/245290
PCT Pub. Date: Dec. 26, 2019

(65) Prior Publication Data
US 2021/0235337 A1    Jul. 29, 2021

(30) Foreign Application Priority Data

Jun. 22, 2018  (KR) .................. 10-2018-0072274
Jan. 28, 2019  (KR) .................. 10-2019-0010726

(51) Int. Cl.
| H04W 36/00 | (2009.01) |
| H04W 76/19 | (2018.01) |
| H04W 36/30 | (2009.01) |

(52) U.S. Cl.
CPC ... *H04W 36/0079* (2018.08); *H04W 36/0072* (2013.01); *H04W 36/305* (2018.08); *H04W 76/19* (2018.02)

(58) Field of Classification Search
CPC ......... H04W 36/0079; H04W 36/0072; H04W 36/305; H04W 76/19; H04W 36/0083;
(Continued)

(56) References Cited

U.S. PATENT DOCUMENTS

| 2009/0046573 A1 | 2/2009 | Damnjanovic |
| 2010/0124173 A1 | 5/2010 | Agashe et al. |

(Continued)

OTHER PUBLICATIONS

PCT International Application No. PCT/KR2019/007428, International Search Report dated Sep. 25, 2019, 2 pages.
(Continued)

*Primary Examiner* — Nam T Huynh
(74) *Attorney, Agent, or Firm* — Lee Hong Degerman Kang Waimey

(57) ABSTRACT

A method and apparatus for providing beam related information for connection failure detection in a wireless communication system is provided. In case that radio link failure (RLF) occurs due to too late handover, too early handover or handover to wrong cell, a gNB in which a user equipment (UE) attempts to re-establish or establish a radio resource control (RRC) connection provides RLF related information with beam related information to a gNB at which RLF happened.

6 Claims, 19 Drawing Sheets

(58) Field of Classification Search
CPC ..... H04W 24/02; H04W 76/27; H04W 88/08; H04W 92/20; H04W 72/046; H04B 7/0695; H04B 7/0617
See application file for complete search history.

(56) References Cited

U.S. PATENT DOCUMENTS

2018/0083688 A1   3/2018  Agiwal et al.
2019/0215756 A1*  7/2019  Park ...................... H04W 52/06
2019/0253949 A1*  8/2019  Park .................. H04W 36/0077

OTHER PUBLICATIONS

Nokia et al., "S-RLF handling for MR-DC," 3GPP TSG-RAN WG3 #97-bis, R3-173497, Prague, Czechia, EU, Aug. 9-13, 2017, 7 pages.
NTT Docomo, Inc. et al., "RLC failure indication over F1," 3GPP TSG-RAN WG3 #98, R3-174590, Reno, NV, USA, Nov. 27-Dec. 1, 2017, 6 pages.
Section 6 of 3GPP TS 38.401 V15.1.0 (Mar. 2018); 3GPP; TSGRAN; NG-RAN; Architecture description (Release 15); 5 pages.
Sections 5.2 and 7.1 of 3GPP TS 38.470 V15.1.0 (Mar. 2018); 3GPP; TSGRAN; NG-RAN; F1 general aspects and principles (Release 15); 5 pages.

* cited by examiner

METHOD AND APPARATUS FOR PROVIDING BEAM RELATED INFORMATION FOR CONNECTION FAILURE DETECTION IN WIRELESS COMMUNICATION SYSTEM

CROSS-REFERENCE TO RELATED APPLICATIONS

This application is the National Stage filing under 35 U.S.C. 371 of International Application No. PCT/KR2019/007428, filed on Jun. 20, 2019, which claims the benefit of earlier filing date and right of priority to Korean Application Nos. 10-2018-0072274, filed on Jun. 22, 2018, and 10-2019-0010726, filed on Jan. 28, 2019, the contents of which are all hereby incorporated by reference herein in their entirety.

TECHNICAL FIELD

The present invention relates to wireless communication and, more particularly, to a method and apparatus for providing beam related information for connection failure detection in a wireless communication system, specifically in a new radio access technology (NR) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In LTE/LTE-A, mobility robustness optimization (MRO) aims at detecting and enabling correction of following problems.

Connection failure due to intra-LTE or inter radio access technology (RAT) mobility Unnecessary handover to another RAT (too early inter-RAT handover with no radio link failure)

Inter-RAT ping-pong.

SUMMARY

NR may also consider to introduce MRO to detect connection failures that happen when a user equipment (UE) moves between gNBs. Furthermore, it may be considered to detect connection failure when beam failure happens. However, currently, the gNB cannot not aware that radio link failure (RLF) occurs due to beam failure.

In an aspect, a method performed by a first gNB in a wireless communication system is provided. The method includes receiving, from a user equipment (UE), beam related information for a radio link failure (RLF), and transmitting, to a second gNB, the beam related information for the RLF.

In another aspect, a method performed by a gNB central unit (gNB-CU) of a first gNB in a wireless communication system is provided. The method includes receiving, from a second gNB, beam related information for a radio link failure (RLF), and transmitting, to a gNB distributed unit (gNB-DU) of the first gNB, information on a beam on which the RLF happens.

In another aspect, a method performed by a gNB central unit (gNB-CU) of a gNB in a wireless communication system is provided. The method includes receiving, from a user equipment (UE) via a gNB distributed unit (gNB-DU) of the gNB, beam related information for a radio link failure (RLF), and transmitting, to the gNB-DU of the gNB, information on a beam on which the RLF happens.

When beam failure happens during/after mobility procedure, as the beam related information is informed to gNB and/or exchanged between gNBs, gNBs can know whether RLF occurs due to beam failure. Therefore, mobility can be performed efficiently.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
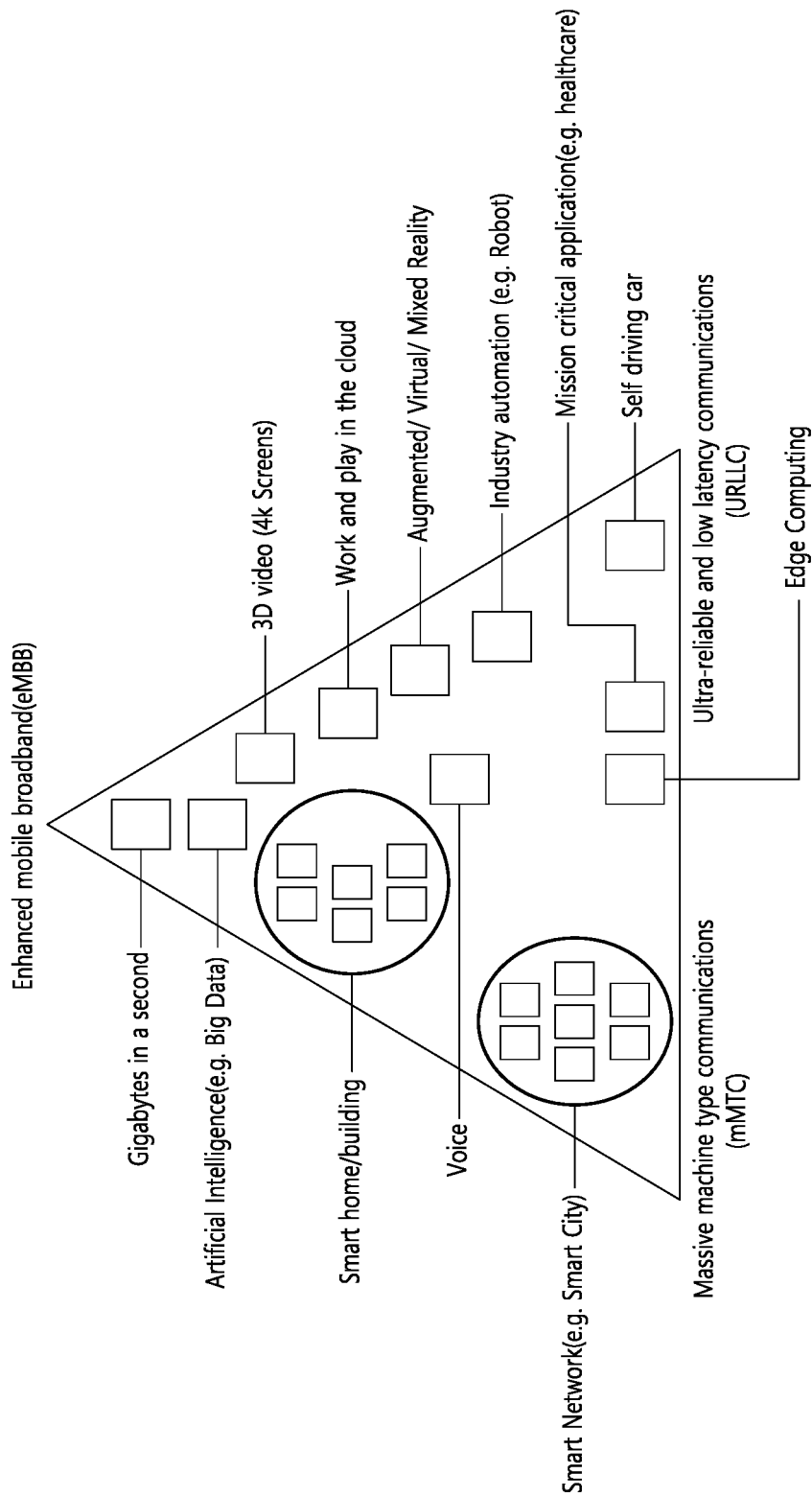
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
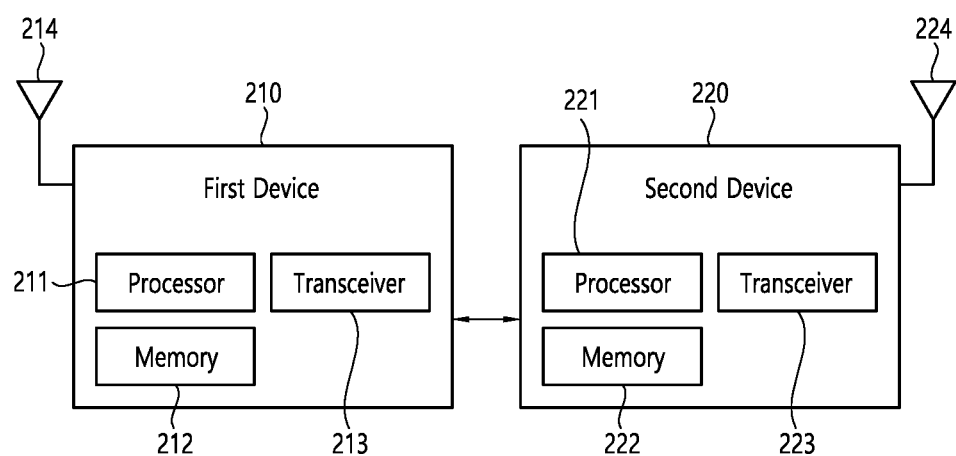
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
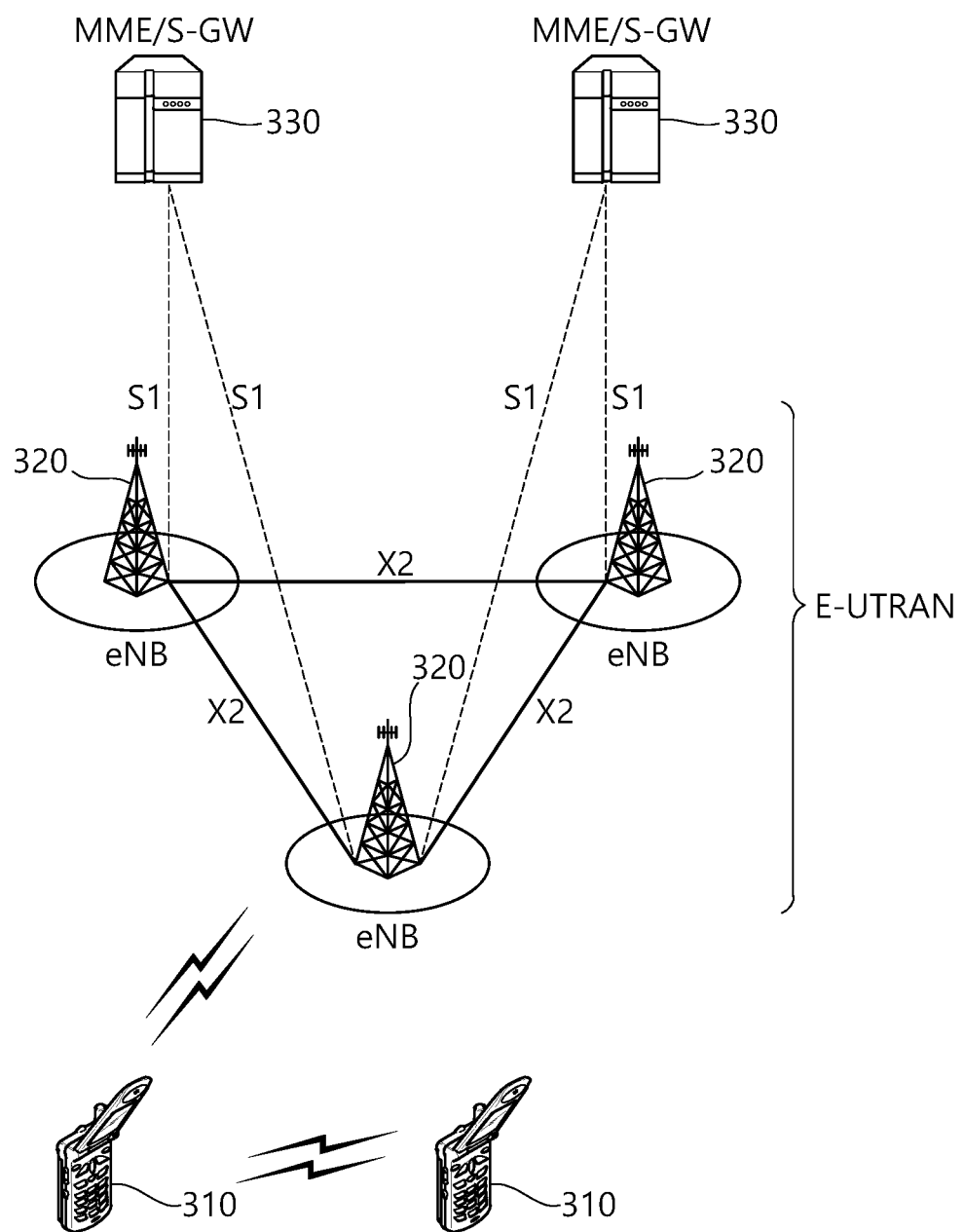
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
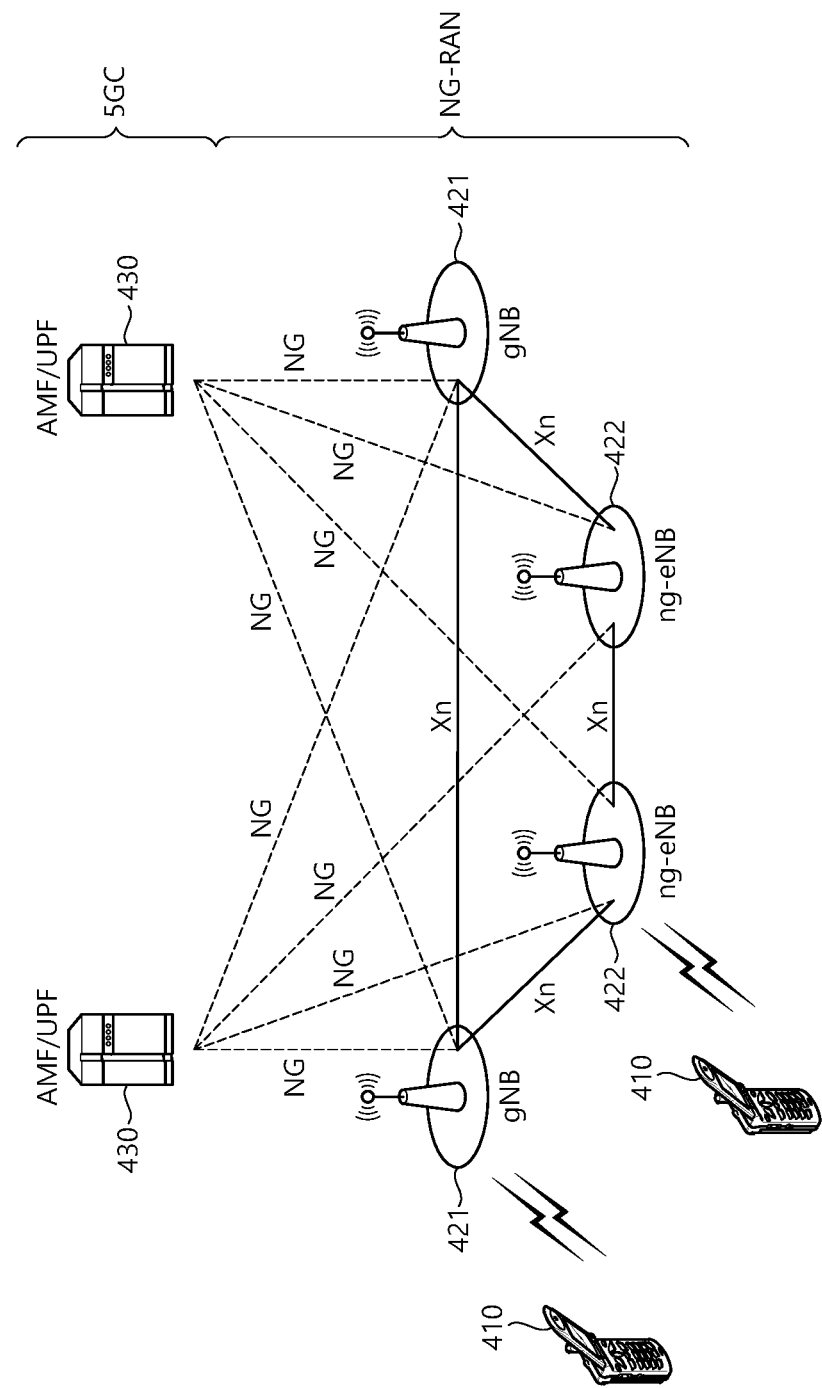
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW).

The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
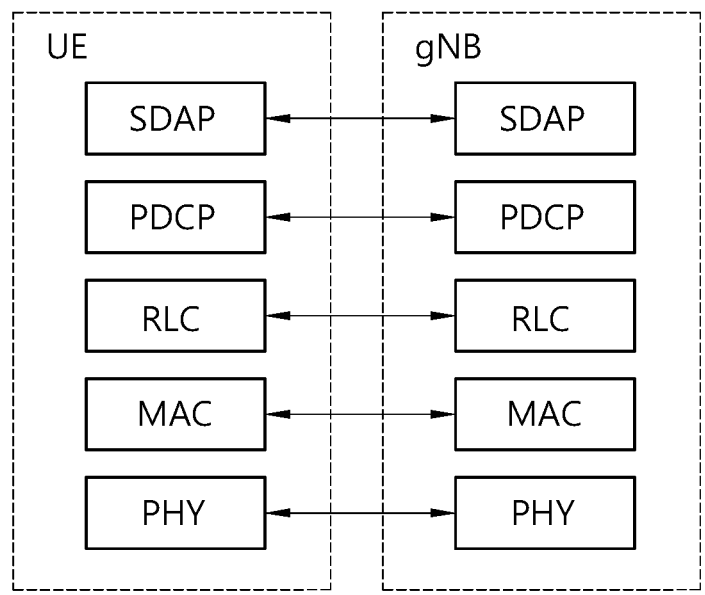
FIG. 5 shows a block diagram of a user plane protocol stack to which the technical features of the present invention can be applied.
Figure 6:
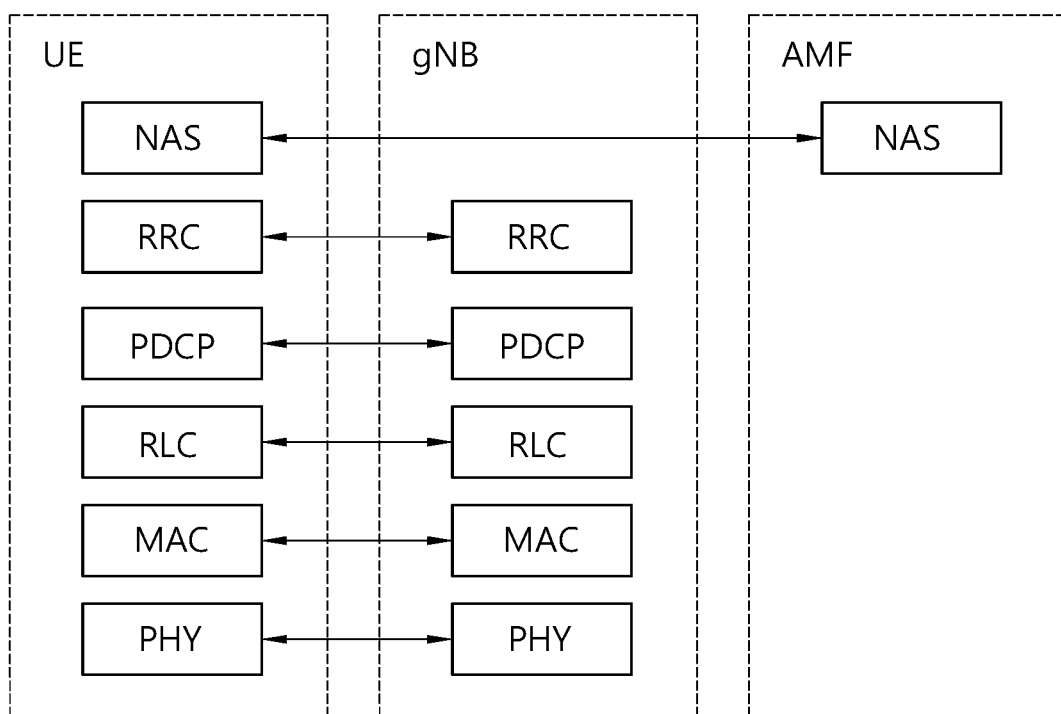
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Split of gNB central unit (gNB-CU) and gNB distributed unit (gNB-DU) is described. Section 6 of 3GPP TS 38.401 V15.1.0 (2018-03) and Sections 5.2 and 7.1 of 3GPP TS 38.470 V15.1.0 (2018-03) may be referred.

Figure 7:
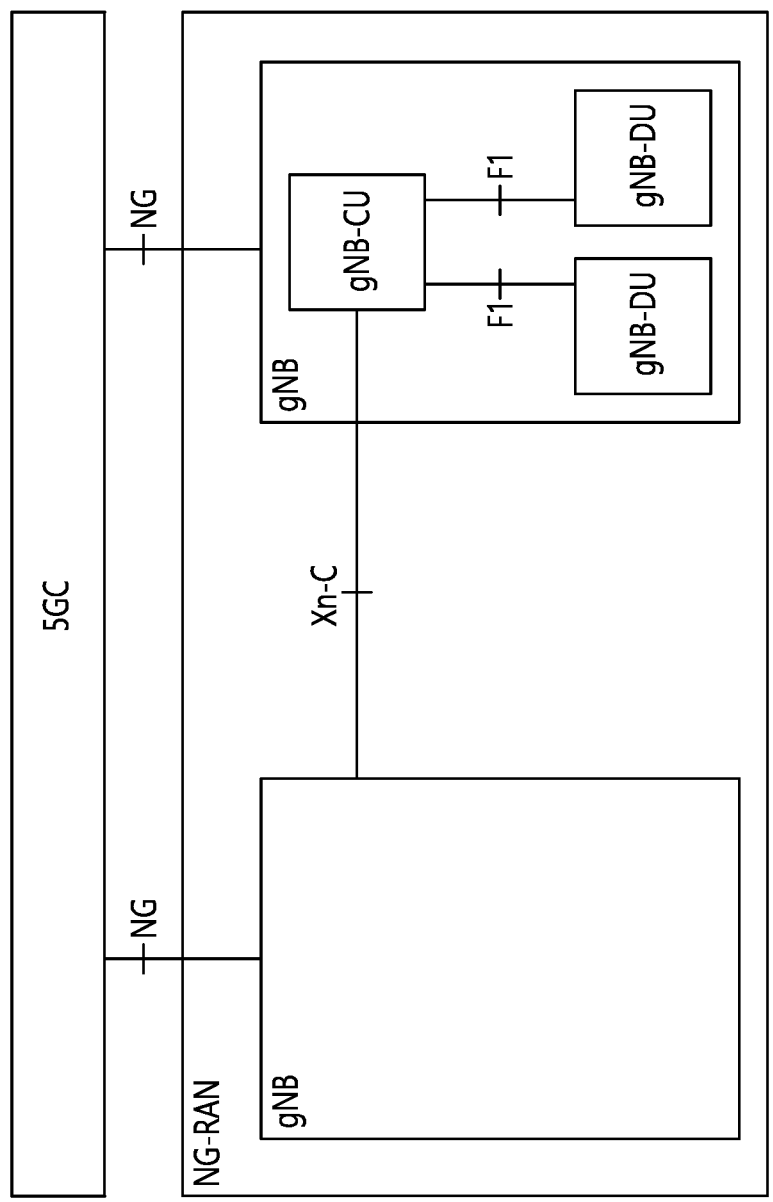
FIG. 7 shows an example of the overall architecture of an NG-RAN to which technical features of the present invention can be applied.

FIG. 7 shows an example of the overall architecture of an NG-RAN to which technical features of the present invention can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F2 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

Figure 8:
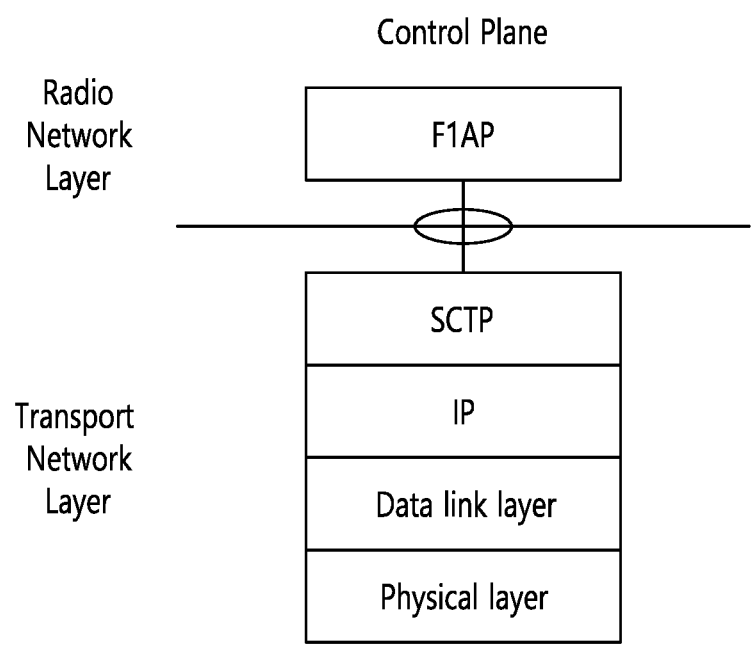
FIG. 8 shows an interface protocol structure for F1-C to which technical features of the present invention can be applied.

FIG. 8 shows an interface protocol structure for F1-C to which technical features of the present invention can be applied.

Referring to FIG. 8, a transport network layer (TNL) is based on Internet protocol (IP) transport, comprising a stream control transmission protocol (SCTP) layer on top of the IP layer. An application layer signaling protocol is referred to as an F1 application protocol (F1AP).

In LTE/LTE-A, one of the functions of mobility robustness optimization (MRO) is to detect connection failures that occur due to too late handover, too early handover, or handover to wrong cell. These problems are defined as follows:

Too late handover: A radio link failure (RLF) occurs after the UE has stayed for a long period of time in the cell. The UE attempts to re-establish the radio link connection in a different cell.

Too early handover: An RLF occurs shortly after a successful handover from a source cell to a target cell or a handover failure (HOF) occurs during the handover procedure. The UE attempts to re-establish the radio link connection in the source cell.

Handover to wrong cell: An RLF occurs shortly after a successful handover from a source cell to a target cell or a handover failure occurs during the handover procedure. The UE attempts to re-establish the radio link connection in a cell other than the source cell and the target cell.

Like LTE, NR may also consider MRO to detect connection failures that occur due to too late handover, too early handover, or handover to wrong cell, to reduce or avoid RLF and/or HOF without involving human when a UE moves between gNBs.

Meanwhile, beam failure may be considered as conditions for declaring RLF in NR.

That is, when beam failure happens, it may be considered to declare RLF. However, when the beam failure happens, the gNB may not aware that the RLF occurs due to beam failure or not. Specifically, if RLF happens due to beam failure, the random access channel (RACH) procedure may be performed based on the beam failure recovery configuration (BeamFailureRecoveryConfig). If the RACH procedure for the beam failure recovery is not completed during the valid time, the UE's MAC layer may inform UE's RRC layer that the RACH procedure is not succeeded via random access problem indication and the RLF may be declared. So, the gNB may not know whether the RLF is declared due to beam failure or due to RACH procedure failure for the beam failure recovery.

In other words, if NR considers MRO, it should be possible to detect connection failure occurred due to the beam failure, which may be caused in case of too late handover, too early handover, or handover to wrong cell. For these cases, in order for the gNB to detect connection failure by the beam failure and to reduce and/or avoid connection failure, the solution for how the gNB can know whether the RLF occurs due to beam failure may be necessary. Furthermore, signaling between adjacent gNBs to detect connection failures due to beam failure may also be necessary.

1. Embodiment 1

Figure 9:
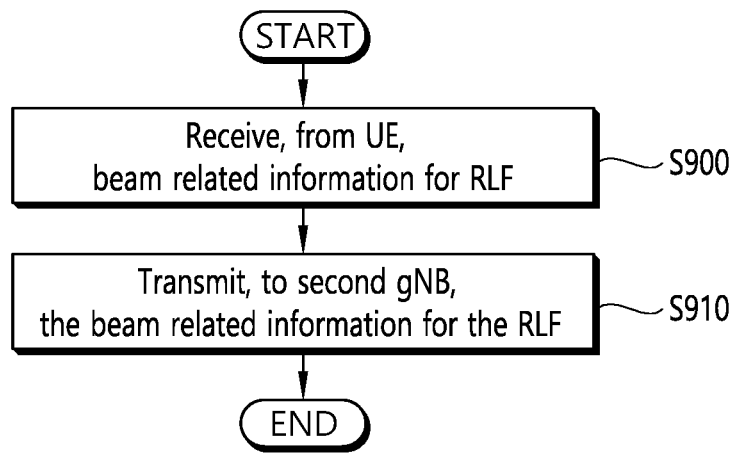
FIG. 9 shows an example of a method for providing beam related information according to an embodiment of the present invention.

FIG. 9 shows an example of a method for providing beam related information according to an embodiment of the present invention.

To address the problem described above, according to the present disclosure, a gNB in which the UE attempts to re-establish or establish an RRC connection may provide RLF related information with beam related information to a gNB at which RLF happened via Xn interface, when the RRC connection is recovered in case of too late handover, too early handover or handover to wrong Cell. The beam related information may contain a list of beams which the source/target gNB allocated and/or information on a beam which the UE has used among the list of beams until the RLF happens.

Referring to FIG. 9, in step S900, the first gNB receives, from the UE, beam related information for RLF. In step S910, the first gNB transmits, to the second gNB, the beam related information for the RLF.

The first gNB may be a target gNB of a handover procedure, and the second gNB may a source gNB of the handover procedure. The RLF may happen during the handover procedure. This case may correspond to RLF in case of too late handover. This case may be described in detail in FIG. 10 below. In this case, the beam related information for the RLF may include information on a list of beams allocated by the source gNB and/or information on a beam among the list of beams used by the UE until the RLF happens.

Alternatively, the first gNB may be a source gNB of a handover procedure, and the second gNB may be a target gNB of the handover procedure. The RLF may happen after the handover procedure is completed. This case may correspond to RLF in case of too early handover. This case may be described in detail in FIG. 11 below. In this case, the beam related information for the RLF may include information on a list of beams allocated by the target gNB and/or information on a beam among the list of beams used by the UE until the RLF happens.

Alternatively, the first gNB may be a gNB other than a source gNB or a target gNB of the handover procedure, and the second gNB may be the target gNB of the handover procedure. The RLF may happen after the handover procedure is completed. This case may correspond to RLF in case of handover to wrong cell. This case may be described in detail in FIG. 12 below. In this case, the beam related information for the RLF may include information on a list of beams allocated by the target gNB and/or information on a beam among the list of beams used by the UE until the RLF happens.

Figure 10:
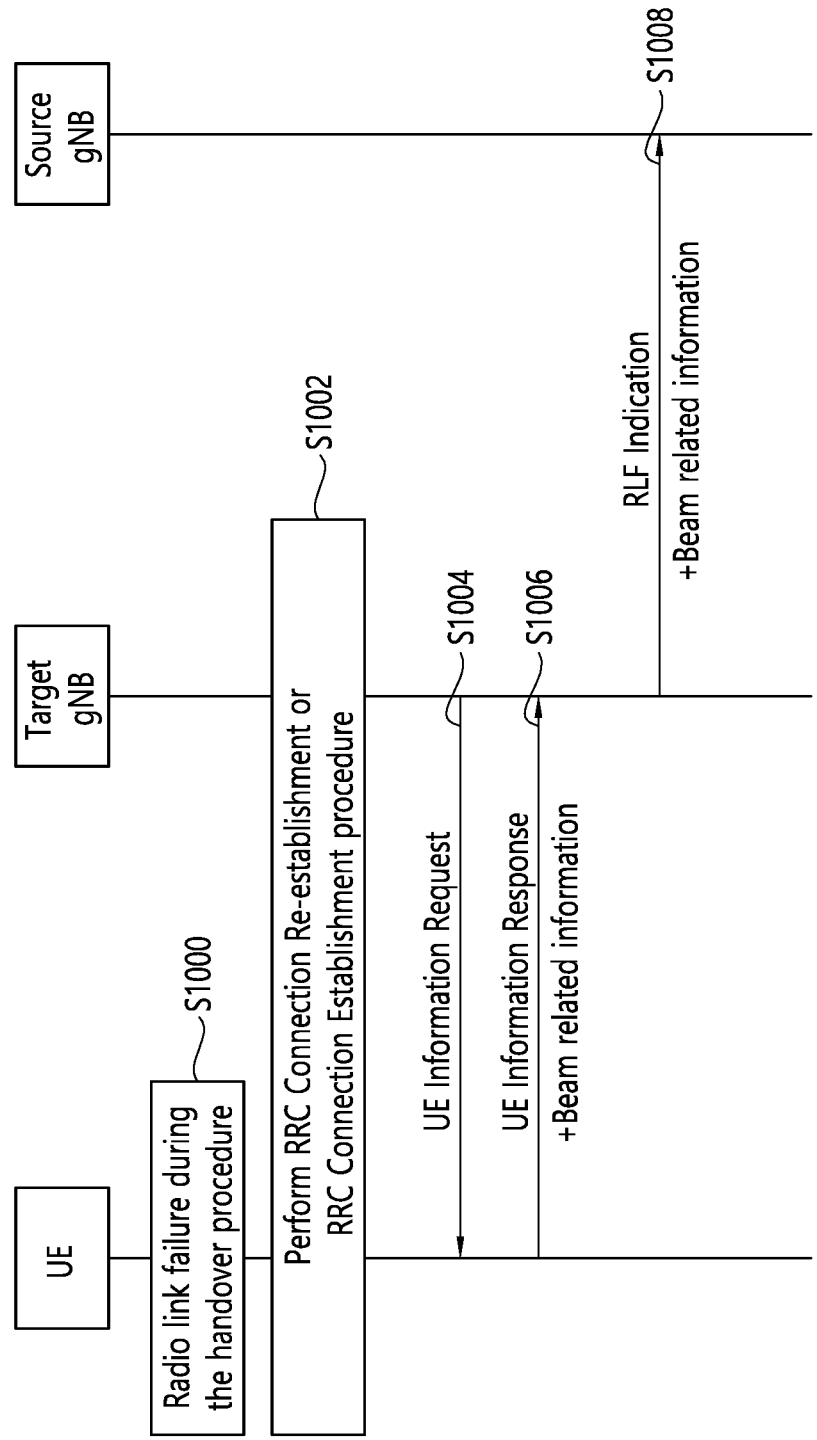
FIG. 10 shows an example of a method for providing beam related information in case of too late handover according to an embodiment of the present invention.

FIG. 10 shows an example of a method for providing beam related information in case of too late handover according to an embodiment of the present invention.

In this example, the RLF related information with the beam related information is transferred in too late handover case.

In step S1000, the RLF happens during the handover procedure.

In step S1002, to recover an RRC connection with the target gNB, the UE performs RRC connection re-establishment procedure or RRC connection establishment procedure with the target gNB.

In step S1004, after recovering the RRC connection, the target gNB transmits the UE Information Request message to the UE to request reporting of RLF related information. The UE Information Request message may be an existing message and/or may be replaced with a new message.

In step S1006, the UE responds with the UE Information Response message to the target gNB. The UE Information Response message may include RLF related information with beam related information. The beam related information may include a list of beams which the source gNB allocated and/or information on a beam which the UE has used among the list of beams allocated by the source gNB until the RLF happens. The UE Information Response message may be an existing message and/or may be replaced with a new message.

In step S1008, the target gNB transmits the RLF Indication message to the source gNB to transfer information related to RRC connection re-establishment (and/or RRC connection establishment attempts) from the UE which suffered connection failure at the source gNB. The RLF Indication message may include the beam related information received from the UE. The beam related information may include a list of beams which the source gNB allocated and/or information on a beam which the UE has used among the list of beams allocated by the source gNB until the RLF happens. As the RLF Indication message may include the beam related information, it may be informed to the source gNB that the connection failure happened when the UE used the beams which the source gNB allocated. The RLF Indication message may be an existing message and/or may be replaced with a new message.

Upon receiving the RLF Indication message from the target gNB, the source gNB may use the beam related information included in the RLF Indication message to reduce and/or avoid the RLF. For example, the source gNB may not allocate beam(s) indicated by the beam related information when another UE is to be handed over to the target gNB. Or, the source gNB may adjust handover parameters based on the beam related information.

Figure 11:
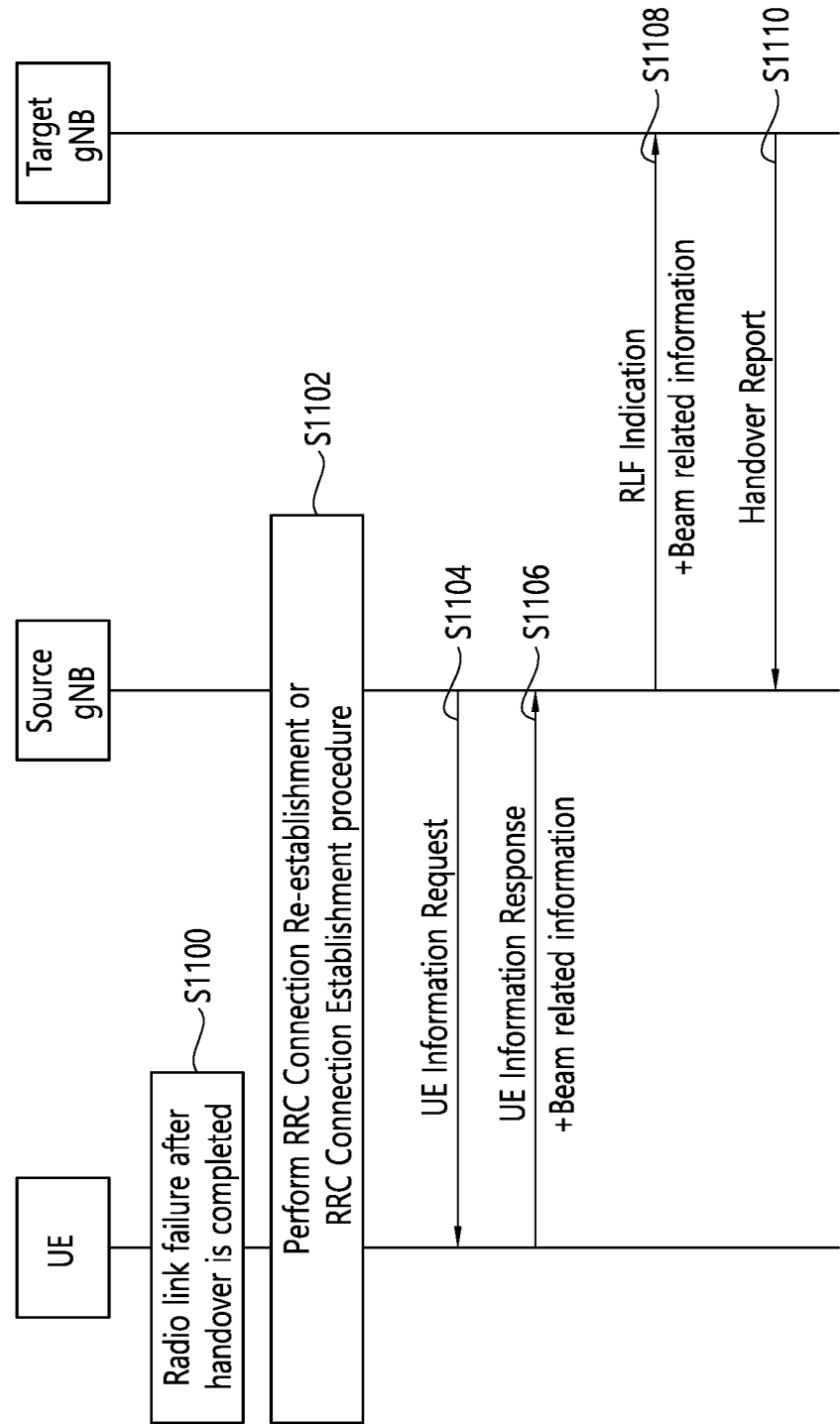
FIG. 11 shows an example of a method for providing beam related information in case of too early handover according to an embodiment of the present invention.

FIG. 11 shows an example of a method for providing beam related information in case of too early handover according to an embodiment of the present invention.

In this example, the RLF related information with the beam related information is transferred in too early handover case.

In step S1100, the RLF happens shortly after the handover for the UE is completed.

In step S1102, to recover an RRC connection with the source gNB, the UE performs RRC connection re-establishment procedure or RRC connection establishment procedure with the source gNB.

In step S1104, after recovering the RRC connection, the source gNB transmits the UE Information Request message to the UE to request reporting of RLF related information. The UE Information Request message may be an existing message and/or may be replaced with a new message.

In step S1106, the UE responds with the UE Information Response message to the source gNB. The UE Information Response message may include RLF related information with beam related information. The beam related information may include a list of beams which the target gNB allocated and/or information on a beam which the UE has used among the list of beams allocated by the target gNB until the RLF happens. The UE Information Response message may be an existing message and/or may be replaced with a new message.

In step S1108, the source gNB transmits the RLF Indication message to the target gNB to transfer information related to RRC connection re-establishment (and/or RRC connection establishment attempts) from the UE which suffered connection failure at the target gNB. The RLF Indication message may include the beam related information received from the UE. The beam related information may include a list of beams which the target gNB allocated and/or information on a beam which the UE has used among the list of beams allocated by the target gNB until the RLF happens. As the RLF Indication message may include the beam related information, it may be informed to the target gNB that the connection failure happened when the UE used the beams which the target gNB allocated. The RLF Indication message may be an existing message and/or may be replaced with a new message.

Upon receiving the RLF Indication message from the source gNB, the target gNB may use the beam related information included in the RLF Indication message to reduce and/or avoid the RLF. For example, the target gNB may not allocate beam(s) indicated by the beam related information when another UE is to be handed over to the target gNB. Or, the target gNB may adjust handover parameters based on the beam related information.

In step S1110, the target gNB transmits the Handover Report message to the source gNB to transfer mobility related information between gNBs. The Handover Report message may be an existing message and/or may be replaced with a new message.

Figure 12:
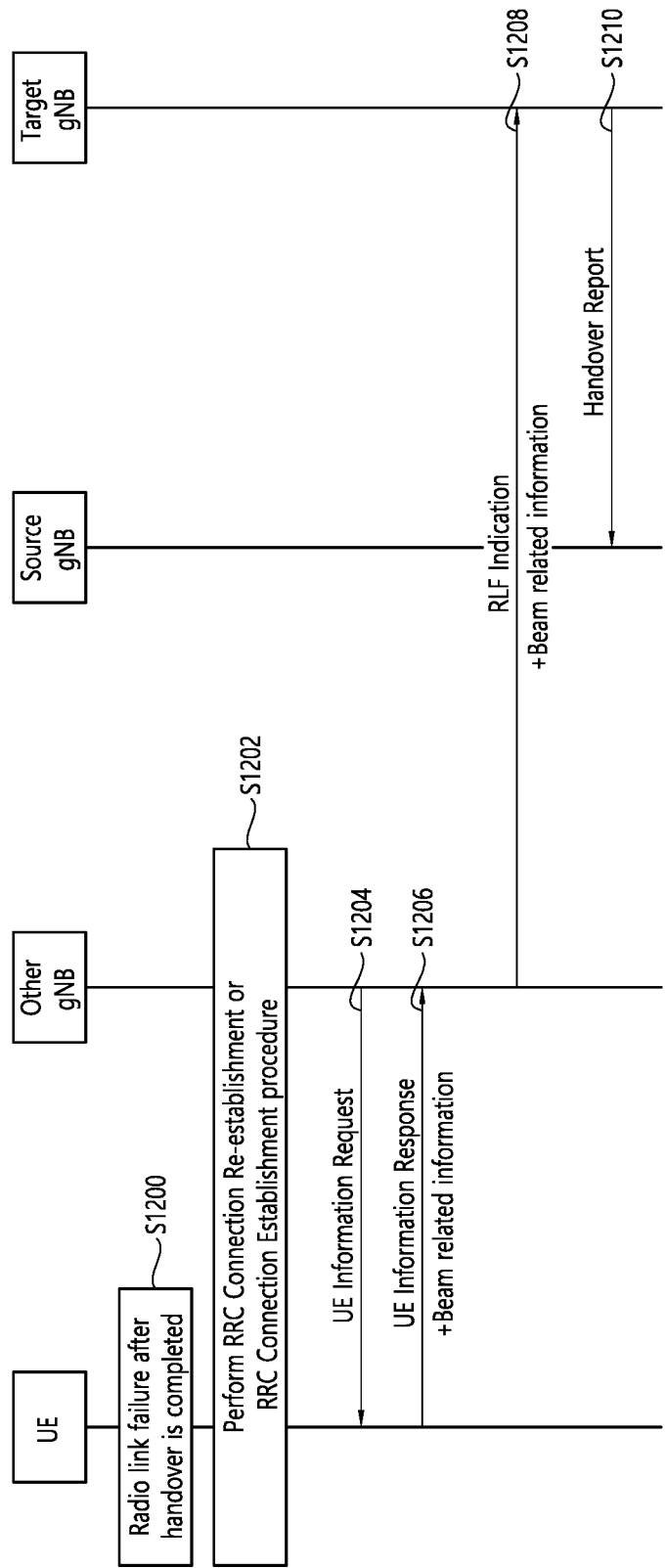
FIG. 12 shows an example of a method for providing beam related information in case of handover to wrong cell according to an embodiment of the present invention.

FIG. 12 shows an example of a method for providing beam related information in case of handover to wrong cell according to an embodiment of the present invention.

In this example, the RLF related information with the beam related information is transferred in handover to wrong cell case.

In step S1200, the RLF happens shortly after the handover for the UE is completed.

In step S1202, to recover an RRC connection with other gNB, the UE performs RRC connection re-establishment procedure or RRC connection establishment procedure with the other gNB.

In step S1204, after recovering the RRC connection, the other gNB transmits the UE Information Request message to the UE to request reporting of RLF related information. The UE Information Request message may be an existing message and/or may be replaced with a new message.

In step S1206, the UE responds with the UE Information Response message to the other gNB. The UE Information Response message may include RLF related information with beam related information. The beam related information may include a list of beams which the target gNB allocated and/or information on a beam which the UE has used among the list of beams allocated by the target gNB until the RLF happens. The UE Information Response message may be an existing message and/or may be replaced with a new message.

In step S1208, the other gNB transmits the RLF Indication message to the target gNB to transfer information related to RRC connection re-establishment (and/or RRC connection establishment attempts) from the UE which suffered connection failure at the target gNB. The RLF Indication message may include the beam related information received from the UE. The beam related information may include a list of beams which the target gNB allocated and/or information on a beam which the UE has used among the list of beams allocated by the target gNB until the RLF happens. As the RLF Indication message may include the beam related information, it may be informed to the target gNB that the connection failure happened when the UE used the beams which the target gNB allocated. The RLF Indication message may be an existing message and/or may be replaced with a new message.

Upon receiving the RLF Indication message from the other gNB, the target gNB may use the beam related information included in the RLF Indication message to reduce and/or avoid the RLF. For example, the target gNB may not allocate beam(s) indicated by the beam related information when another UE is to be handed over to the target gNB. Or, the target gNB may adjust handover parameters based on the beam related information.

In step S1210, the target gNB transmits the Handover Report message to the source gNB to transfer mobility related information between gNBs. The Handover Report message may be an existing message and/or may be replaced with a new message.

According to an embodiment of the present invention shown in FIG. 9 to FIG. 12, the gNB in which the UE attempts to re-establish or establish radio link connection can know that RLF occurs due to beam failure and provide information related to the RLF with the beam related information to the gNB at which the RLF happened. So, RLF and/or HOF may be reduced and/or avoided when the UE moves between gNBs. Therefore, UE's experience can be enhanced by detection of connection failures that occur due to too late handover, too early handover, or handover to wrong cell.

2. Embodiment 2

The present disclosure describe above may also be applied to CU-DU split architecture. That is, RLF occurrence in case of too late handover, too early handover and handover to wrong cell may be considered within the gNB in CU-DU split architecture. In this case, in order for the gNB-CU to detect connection failure by the beam failure and to reduce and/or avoid connection failure, the solution for how the gNB-CU can know whether the RLF occurs due to beam failure may be necessary. Furthermore, signaling between the gNB-CU and gNB-DU to adjust beams which the gNB-CU serves may also be necessary.

Figure 13:
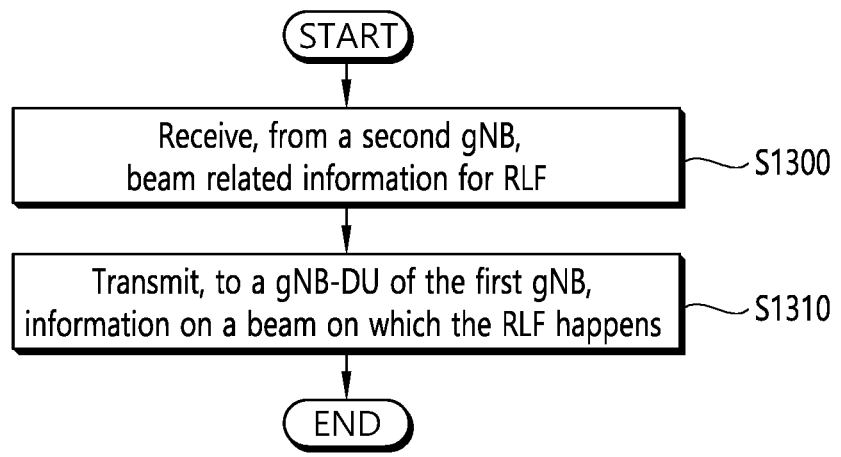
FIG. 13 shows an example of a method for providing information on a beam in CU-DU split architecture according to another embodiment of the present invention.

FIG. 13 shows an example of a method for providing information on a beam in CU-DU split architecture according to another embodiment of the present invention.

To address the problem described above, according to the present disclosure, if the gNB which receives RLF related information with beam related information has the CU-DU split architecture and the gNB receives the beam related information continuously, the gNB-CU may provide information on beam(s) that the RLF occurred and/or information that the gNB-CU removes the beam(s) that the RLF occurred from a list of beams that the gNB-CU serves to the gNB-DU via F1 interface. The information offered by the gNB-CU may include the beam index(es) and/or the beam related parameters. Then, upon receiving the information from the gNB-CU, the gNB-DU may provide the gNB-CU with the list of beams which are reconstituted by the gNB-DU based on the information.

Referring to FIG. 13, in step S1300, the gNB-CU of the first gNB receives, from the second gNB, beam related information for RLF. In step S1310, the gNB-CU of the first gNB transmits, to the gNB-DU of the first gNB, information on a beam on which the RLF happens.

The information on the beam may include a troubled beam indication indicating the beam on which the RLF happens. In this case, the gNB-CU of the first gNB may further receive a list of beams excluding the beam from the gNB-DU of the first gNB. Alternatively, the information on the beam may include a removed beam indication indicating that the beam is removed from a list of beams allocated by the gNB-DU of the first gNB.

The first gNB may be a source gNB of a handover procedure, and the second gNB may be a target gNB of the handover procedure. The RLF may happen during the handover procedure. This case may correspond to RLF in case of too late handover. This case may be described in detail in FIG. 14 below.

Alternatively, the first gNB may be a target gNB of a handover procedure, and the second gNB may be a source gNB of the handover procedure. The RLF may happen after the handover procedure is completed. This case may correspond to RLF in case of too early handover. This case may be described in detail in FIG. 15 below.

Alternatively, the first gNB may be a target gNB of a handover procedure, and the second gNB may be a gNB other than a source gNB or the target gNB of the handover procedure. The RLF may happen after the handover procedure is completed. This case may correspond to RLF in case of handover to wrong cell. This case may be described in detail in FIG. 16 below.

Figure 14:
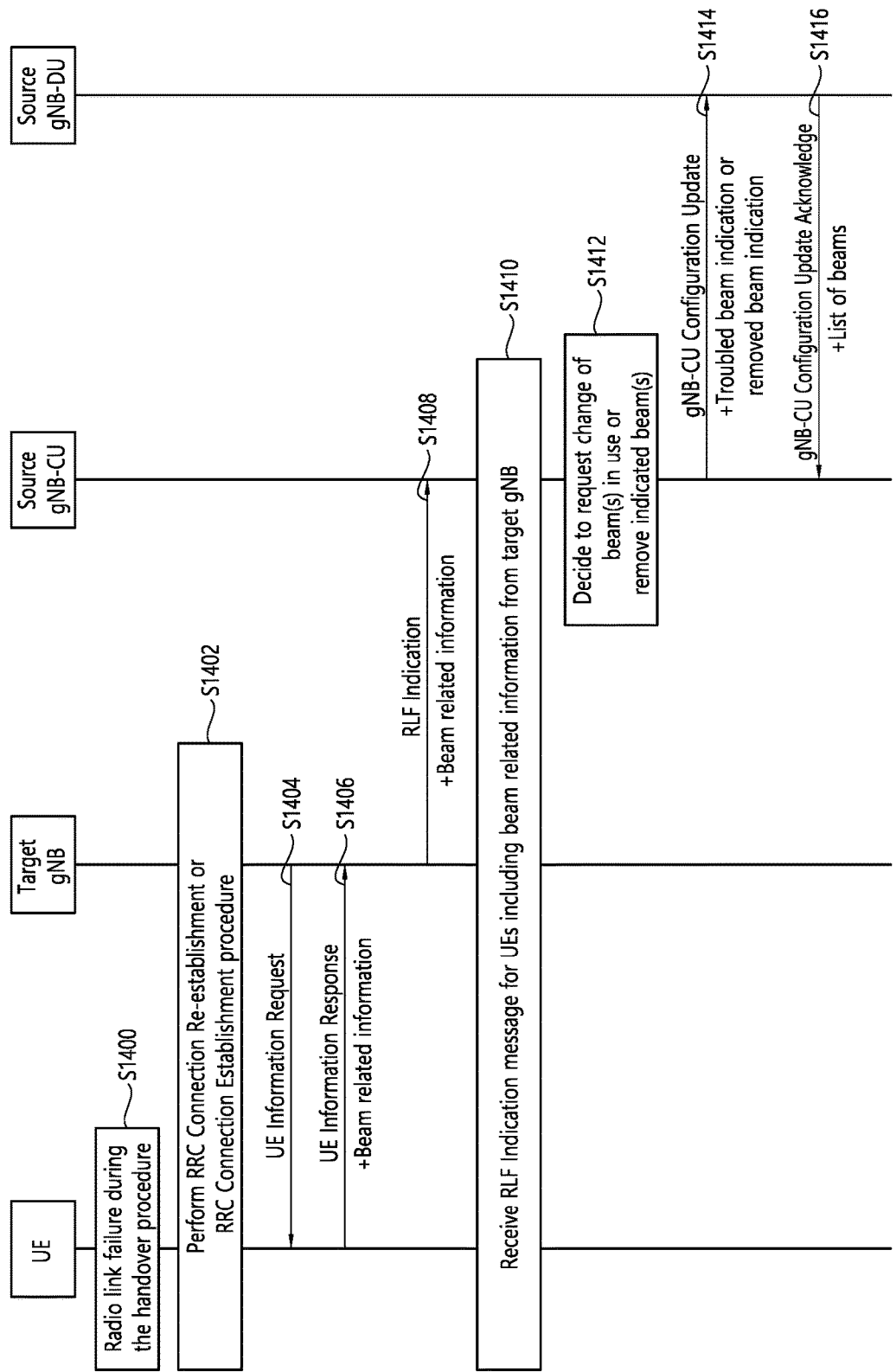
FIG. 14 shows an example of a method for providing information on a beam in CU-DU split architecture in case of too late handover according to an embodiment of the present invention.

FIG. 14 shows an example of a method for providing information on a beam in CU-DU split architecture in case of too late handover according to an embodiment of the present invention.

In this example, the RLF related information with the beam related information is transferred in too late handover case.

In step S1400, the RLF happens during the handover procedure.

In step S1402, to recover an RRC connection with the target gNB, the UE performs RRC connection re-establishment procedure or RRC connection establishment procedure with the target gNB.

In step S1404, after recovering the RRC connection, the target gNB transmits the UE Information Request message to the UE to request reporting of RLF related information. The UE Information Request message may be an existing message and/or may be replaced with a new message.

In step S1406, the UE responds with the UE Information Response message to the target gNB. The UE Information Response message may include RLF related information with beam related information. The beam related information may include a list of beams which the source gNB allocated and/or information on a beam which the UE has used among the list of beams allocated by the source gNB until the RLF happens. The UE Information Response message may be an existing message and/or may be replaced with a new message.

In step S1408, the target gNB transmits the RLF Indication message to the source gNB/gNB-CU to transfer information related to RRC connection re-establishment (and/or RRC connection establishment attempts) from the UE which suffered connection failure at the source gNB. The RLF Indication message may include the beam related information received from the UE. The beam related information may include a list of beams which the source gNB allocated and/or information on a beam which the UE has used among the list of beams allocated by the source gNB until the RLF happens. As the RLF Indication message may include the beam related information, it may be informed to the source gNB that the connection failure happened when the UE used the beams which the source gNB allocated. The RLF Indication message may be an existing message and/or may be replaced with a new message.

Upon receiving the RLF Indication message from the target gNB, the source gNB may use the beam related information included in the RLF Indication message to reduce and/or avoid the RLF. For example, the source gNB may not allocate beam(s) indicated by the beam related information when another UE is to be handed over to the target gNB. Or, the source gNB may adjust handover parameters based on the beam related information.

In step S1410, the source gNB/gNB-CU may receive the RLF Indication message including the beam related information from the target gNB, whenever a connection failure for the beam which the UE uses during the handover procedure occurs and then a connection with the target gNB is recovered.

In step S1412, when beam related information about certain beam(s) is received consistently from the target gNB, the source gNB/gNB-CU may decide to request change of beam(s) currently in use and/or to remove the certain beam(s) from a list of beams which the source gNB/gNB-CU has.

In step S1414, the source gNB-CU transmits the gNB-CU Configuration Update message to the source gNB-DU. For requesting change of beam(s) currently in use, the gNB-CU Configuration Update message may include a troubled beam indication indicating beam(s) that a connection failure happened. For removing beam(s) indicated by the beam related information received from the target gNB, the gNB-CU Configuration Update message may include a removed beam indication informing the source gNB-DU that the beam(s) indicated by the beam related information is removed from a list of beams allocated by the source gNB-DU. Each of the troubled beam indication or the removed beam indication may include the beam index(es) of the corresponding beam(s) and/or the beam related parameters. The gNB-CU Configuration Update message may be an existing message and/or may be replaced with a new message.

In step S1416, upon receiving the gNB-CU Configuration Update message including the troubled beam indication from the source gNB-CU, the source gNB-DU makes/generates a list of beams excluding the beam(s) indicated by the troubled beam indication and/or the list of beams which the source gNB-DU newly allocates. Then, the source gNB-DU transmits the gNB-CU Configuration Update Acknowledge message including the list of beams to the source gNB-CU. The gNB-CU Configuration Update Acknowledge message may be an existing message and/or may be replaced with a new message.

Alternatively, upon receiving the gNB-CU Configuration Update message including the removed beam indication from the source gNB-CU, the source gNB-DU removes the beam(s) indicated by the removed beam indication from the list of beams which the source gNB-DU allocated. Then, the source gNB-DU may transmit the gNB-CU Configuration Update Acknowledge message to the source gNB-CU. The gNB-CU Configuration Update Acknowledge message may be an existing message and/or may be replaced with a new message.

When or after receiving the gNB-CU Configuration Update Acknowledge message from the source gNB-DU and/or transmitting the gNB-CU Configuration Update message including the removed beam indication to the source gNB-DU, the source gNB-CU may allocate beam to UEs within its coverage based on the received and/or modified list of beams. Then, the source gNB-CU may transmit the allocated beam related information to UEs using the RRC message (e.g. RRCReconfiguration) via the source gNB-DU.

Figure 15:
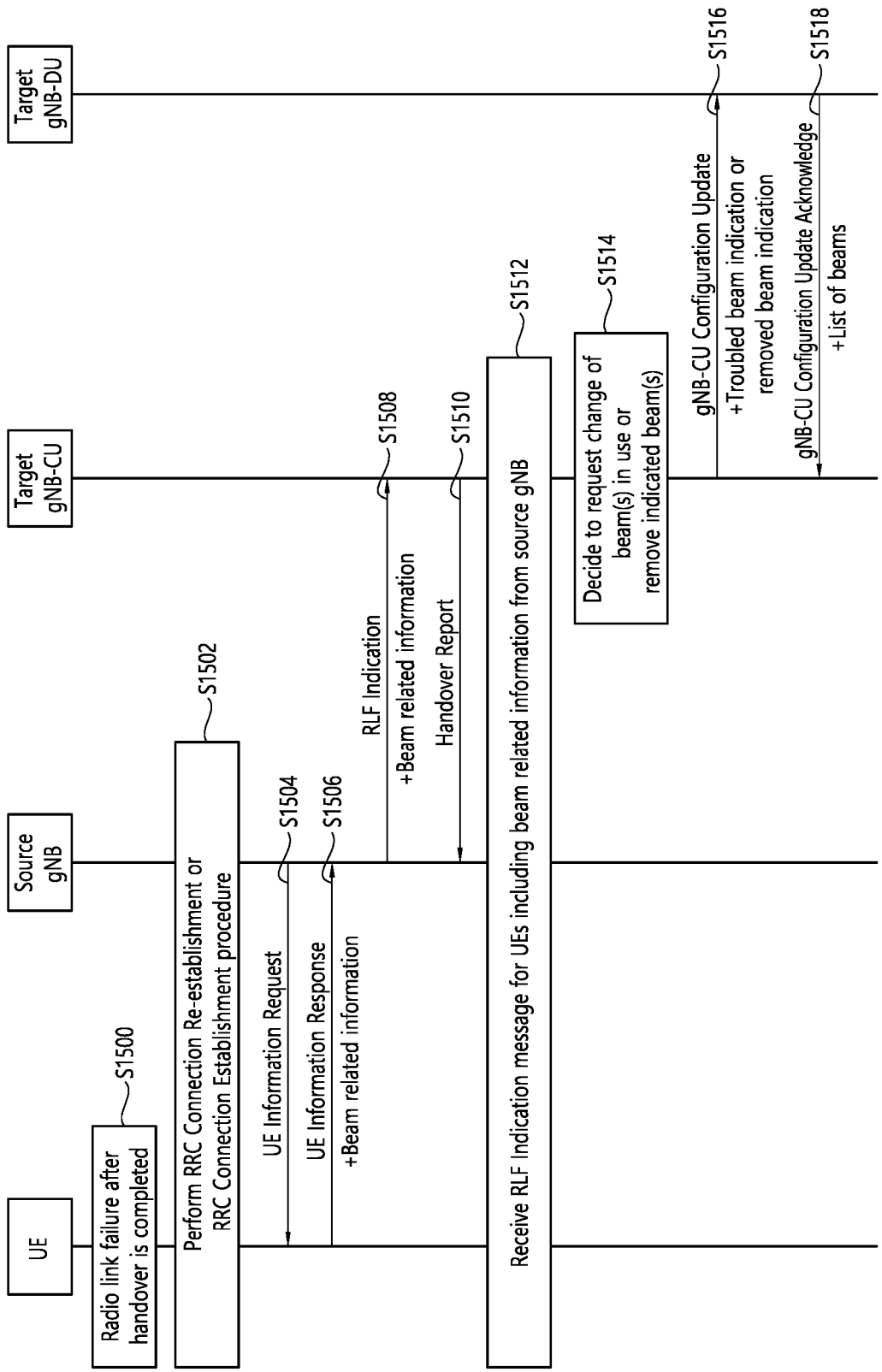
FIG. 15 shows an example of a method for providing information on a beam in CU-DU split architecture in case of too early handover according to an embodiment of the present invention.

FIG. 15 shows an example of a method for providing information on a beam in CU-DU split architecture in case of too early handover according to an embodiment of the present invention.

In this example, the RLF related information with the beam related information is transferred in too early handover case.

In step S1500, the RLF happens shortly after the handover for the UE is completed.

In step S1502, to recover an RRC connection with the source gNB, the UE performs RRC connection re-establishment procedure or RRC connection establishment procedure with the source gNB.

In step S1504, after recovering the RRC connection, the source gNB transmits the UE Information Request message to the UE to request reporting of RLF related information. The UE Information Request message may be an existing message and/or may be replaced with a new message.

In step S1506, the UE responds with the UE Information Response message to the source gNB. The UE Information Response message may include RLF related information with beam related information. The beam related information may include a list of beams which the target gNB allocated and/or information on a beam which the UE has used among the list of beams allocated by the target gNB until the RLF happens. The UE Information Response message may be an existing message and/or may be replaced with a new message.

In step S1508, the source gNB transmits the RLF Indication message to the target gNB/gNB-CU to transfer information related to RRC connection re-establishment (and/or RRC connection establishment attempts) from the UE which suffered connection failure at the target gNB. The RLF Indication message may include the beam related information received from the UE. The beam related information may include a list of beams which the target gNB allocated and/or information on a beam which the UE has used among the list of beams allocated by the target gNB until the RLF happens. As the RLF Indication message may include the beam related information, it may be informed to the target gNB that the connection failure happened when the UE used the beams which the target gNB allocated. The RLF Indication message may be an existing message and/or may be replaced with a new message.

Upon receiving the RLF Indication message from the source gNB, the target gNB may use the beam related information included in the RLF Indication message to reduce and/or avoid the RLF. For example, the target gNB may not allocate beam(s) indicated by the beam related information when another UE is to be handed over to the target gNB. Or, the target gNB may adjust handover parameters based on the beam related information.

In step S1510, the target gNB/gNB-CU transmits the Handover Report message to the source gNB to transfer mobility related information between gNBs. The Handover Report message may be an existing message and/or may be replaced with a new message.

In step S1512, the target gNB/gNB-CU may receive the RLF Indication message including the beam related information from the source gNB, whenever a connection failure for the beam which the UE uses shortly after the handover for the UE is completed occurs and then a connection with the source gNB is recovered.

In step S1514, when beam related information about certain beam(s) is received consistently from the source gNB, the target gNB/gNB-CU may decide to request change of beam(s) currently in use and/or to remove the certain beam(s) from a list of beams which the target gNB/gNB-CU has.

In step S1516, the target gNB-CU transmits the gNB-CU Configuration Update message to the target gNB-DU. For requesting change of beam(s) currently in use, the gNB-CU Configuration Update message may include a troubled beam indication indicating beam(s) that a connection failure happened. For removing beam(s) indicated by the beam related information received from the source gNB, the gNB-CU Configuration Update message may include a removed beam indication informing the target gNB-DU that the beam(s) indicated by the beam related information is removed from a list of beams allocated by the target gNB-DU. Each of the troubled beam indication or the removed beam indication may include the beam index(es) of the corresponding beam(s) and/or the beam related parameters. The gNB-CU Configuration Update message may be an existing message and/or may be replaced with a new message.

In step S1518, upon receiving the gNB-CU Configuration Update message including the troubled beam indication from the target gNB-CU, the target gNB-DU makes/generates a list of beams excluding the beam(s) indicated by the troubled beam indication and/or the list of beams which the target gNB-DU newly allocates. Then, the target gNB-DU transmits the gNB-CU Configuration Update Acknowledge message including the list of beams to the target gNB-CU. The gNB-CU Configuration Update Acknowledge message may be an existing message and/or may be replaced with a new message.

Alternatively, upon receiving the gNB-CU Configuration Update message including the removed beam indication from the target gNB-CU, the target gNB-DU removes the beam(s) indicated by the removed beam indication from the list of beams which the target gNB-DU allocated. Then, the target gNB-DU may transmit the gNB-CU Configuration Update Acknowledge message to the target gNB-CU. The gNB-CU Configuration Update Acknowledge message may be an existing message and/or may be replaced with a new message.

When or after receiving the gNB-CU Configuration Update Acknowledge message from the target gNB-DU and/or transmitting the gNB-CU Configuration Update message including the removed beam indication to the target gNB-DU, the target gNB-CU may allocate beam to UEs within its coverage based on the received and/or modified list of beams. Then, the target gNB-CU may transmit the allocated beam related information to UEs using the RRC message (e.g. RRCReconfiguration) via the target gNB-DU.

Figure 16:
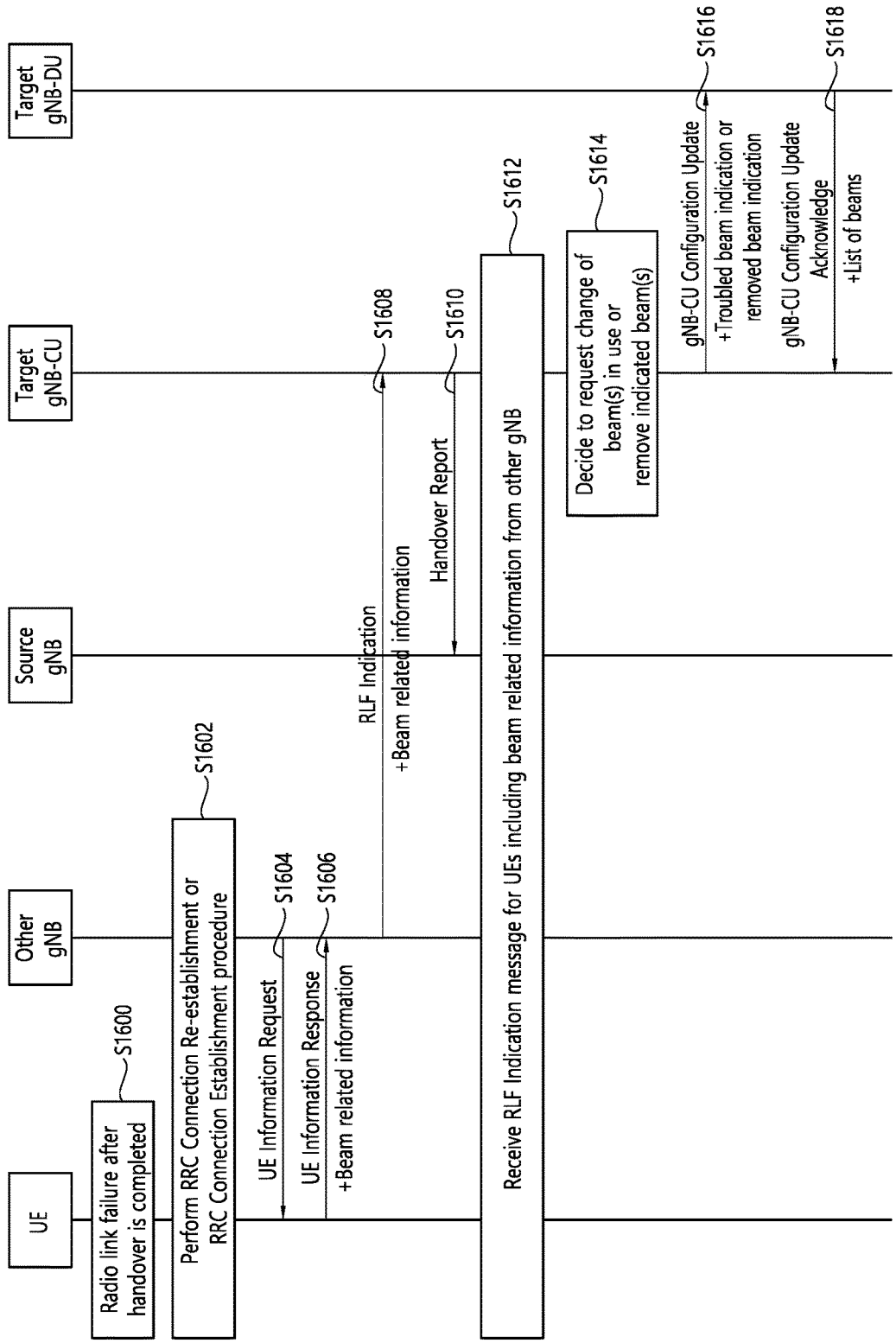
FIG. 16 shows an example of a method for providing information on a beam in CU-DU split architecture in case of handover to wrong cell according to an embodiment of the present invention.

FIG. 16 shows an example of a method for providing information on a beam in CU-DU split architecture in case of handover to wrong cell according to an embodiment of the present invention.

In this example, the RLF related information with the beam related information is transferred in handover to wrong cell case.

In step S1600, the RLF happens shortly after the handover for the UE is completed.

In step S1602, to recover an RRC connection with other gNB, the UE performs RRC connection re-establishment procedure or RRC connection establishment procedure with the other gNB.

In step S1604, after recovering the RRC connection, the other gNB transmits the UE Information Request message to the UE to request reporting of RLF related information. The UE Information Request message may be an existing message and/or may be replaced with a new message.

In step S1606, the UE responds with the UE Information Response message to the other gNB. The UE Information Response message may include RLF related information with beam related information. The beam related information may include a list of beams which the target gNB allocated and/or information on a beam which the UE has used among the list of beams allocated by the target gNB until the RLF happens. The UE Information Response message may be an existing message and/or may be replaced with a new message.

In step S1608, the other gNB transmits the RLF Indication message to the target gNB/gNB-CU to transfer information related to RRC connection re-establishment (and/or RRC connection establishment attempts) from the UE which suffered connection failure at the target gNB. The RLF Indication message may include the beam related information received from the UE. The beam related information may include a list of beams which the target gNB allocated and/or information on a beam which the UE has used among the list of beams allocated by the target gNB until the RLF happens. As the RLF Indication message may include the beam related information, it may be informed to the target gNB that the connection failure happened when the UE used the beams which the target gNB allocated. The RLF Indication message may be an existing message and/or may be replaced with a new message.

Upon receiving the RLF Indication message from the other gNB, the target gNB may use the beam related information included in the RLF Indication message to reduce and/or avoid the RLF. For example, the target gNB may not allocate beam(s) indicated by the beam related information when another UE is to be handed over to the target gNB. Or, the target gNB may adjust handover parameters based on the beam related information.

In step S1610, the target gNB/gNB-CU transmits the Handover Report message to the source gNB to transfer mobility related information between gNBs. The Handover Report message may be an existing message and/or may be replaced with a new message.

In step S1612, the target gNB/gNB-CU may receive the RLF Indication message including the beam related information from the other gNB, whenever a connection failure for the beam which the UE uses shortly after the handover for the UE is completed occurs and then a connection with the other gNB is recovered.

In step S1614, when beam related information about certain beam(s) is received consistently from the other gNB, the target gNB/gNB-CU may decide to request change of beam(s) currently in use and/or to remove the certain beam(s) from a list of beams which the target gNB/gNB-CU has.

In step S1616, the target gNB-CU transmits the gNB-CU Configuration Update message to the target gNB-DU. For requesting change of beam(s) currently in use, the gNB-CU Configuration Update message may include a troubled beam indication indicating beam(s) that a connection failure happened. For removing beam(s) indicated by the beam related information received from the other gNB, the gNB-CU Configuration Update message may include a removed beam indication informing the target gNB-DU that the beam(s) indicated by the beam related information is removed from a list of beams allocated by the target gNB-DU. Each of the troubled beam indication or the removed beam indication may include the beam index(es) of the corresponding beam(s) and/or the beam related parameters. The gNB-CU Configuration Update message may be an existing message and/or may be replaced with a new message.

In step S1618, upon receiving the gNB-CU Configuration Update message including the troubled beam indication from the target gNB-CU, the target gNB-DU makes/generates a list of beams excluding the beam(s) indicated by the troubled beam indication and/or the list of beams which the target gNB-DU newly allocates. Then, the target gNB-DU transmits the gNB-CU Configuration Update Acknowledge message including the list of beams to the target gNB-CU. The gNB-CU Configuration Update Acknowledge message may be an existing message and/or may be replaced with a new message.

Alternatively, upon receiving the gNB-CU Configuration Update message including the removed beam indication from the target gNB-CU, the target gNB-DU removes the beam(s) indicated by the removed beam indication from the list of beams which the target gNB-DU allocated. Then, the target gNB-DU may transmit the gNB-CU Configuration Update Acknowledge message to the target gNB-CU. The gNB-CU Configuration Update Acknowledge message may be an existing message and/or may be replaced with a new message.

When or after receiving the gNB-CU Configuration Update Acknowledge message from the target gNB-DU and/or transmitting the gNB-CU Configuration Update message including the removed beam indication to the target gNB-DU, the target gNB-CU may allocate beam to UEs within its coverage based on the received and/or modified list of beams. Then, the target gNB-CU may transmit the allocated beam related information to UEs using the RRC message (e.g. RRCReconfiguration) via the target gNB-DU.

According to an embodiment of the present invention shown in FIG. 13 to FIG. 16, if the gNB has CU-DU split architecture, the gNB-CU can know that the UEs experience RLF and/or HOF and can know information on beam(s) on which RLF and/or HOF happens. Therefore, the gNB-CU can reconstitute the beams which it serves through the signaling with the gNB-DU. So, RLF and/or HOF may be reduced and/or avoided when the UE moves between gNBs. Therefore, UE's experience can be enhanced by detection of connection failures that occur due to too late handover, too early handover, or handover to wrong cell.

3. Embodiment 3

Figure 17:
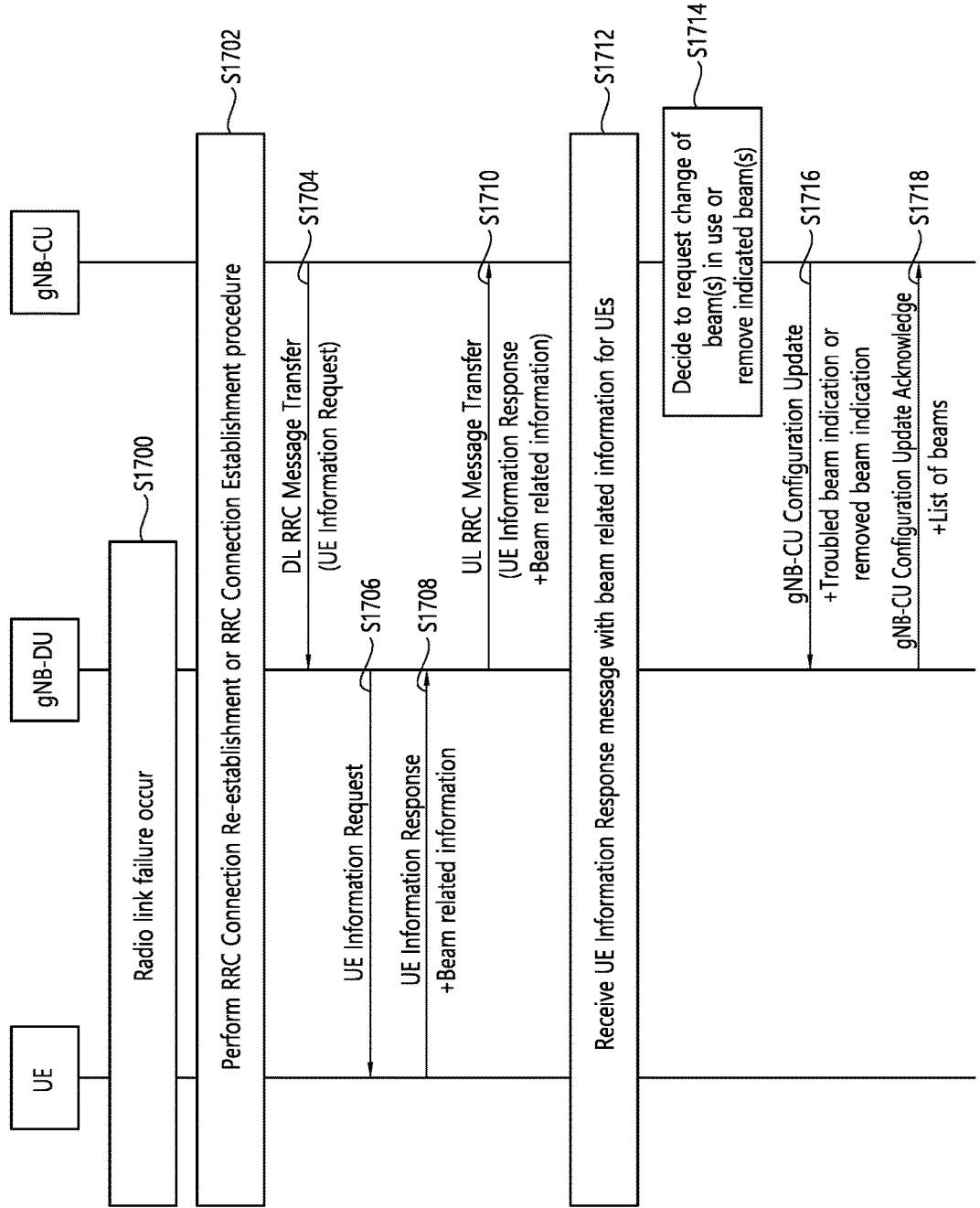
FIG. 17 shows an example of a method for providing information on a beam in CU-DU split architecture according to another embodiment of the present invention.

FIG. 17 shows an example of a method for providing information on a beam in CU-DU split architecture according to another embodiment of the present invention.

According to the present disclosure, if the gNB-CU receives continuously RLF related information with beam related information from UEs which recover an RRC connection within the gNB-CU's coverage after the RLF happened, the gNB-CU may provide information on beam(s) that the RLF occurred and/or information that the gNB-CU removes the beam(s) that the RLF occurred from a list of beams that the gNB-CU serves to the gNB-DU via F1 interface. The information offered by the gNB-CU may include the beam index(es) and/or the beam related parameters. Then, upon receiving the information from the gNB-CU, the gNB-DU may provide the gNB-CU with the list of beams which are reconstituted by the gNB-DU based on the information.

In step S1700, RLF happens.

In step S1702, to recover an RRC connection with the gNB, the UE performs RRC connection re-establishment procedure or RRC connection establishment procedure with the gNB.

In step S1704, after recovering the RRC connection, the gNB-CU transmits the DL RRC Message Transfer message including the UE Information Request message to the gNB-DU to request reporting of RLF related information. The UE Information Request message may be an existing message and/or may be replaced with a new message.

In step S1706, upon receiving the DL RRC Message Transfer message including the UE Information Request message from the gNB-CU, the gNB-DU forwards the UE Information Request message to the UE.

In step S1708, the UE responds with the UE Information Response message to the gNB-DU. The UE Information Response message may include RLF related information with beam related information. The beam related information may include a list of beams which the gNB allocated and/or information on a beam which the UE has used among the list of beams allocated by the gNB until the RLF happens. The UE Information Response message may be an existing message and/or may be replaced with a new message.

In step S1710, upon receiving the UE Information Response message from the UE, the gNB-DU transmits the UL RRC Message Transfer message including the UE Information Response message to the gNB-CU.

In step S1712, the gNB-CU may receive the UE Information Response message including the beam related information from the UE via the gNB-DU, whenever a connection failure for the beam which the UE uses occurs and then a connection with the gNB is recovered.

In step S1714, when beam related information about certain beam(s) is received consistently from the UE via the gNB-DU, the gNB-CU may decide to request change of beam(s) currently in use and/or to remove the certain beam(s) from a list of beams which the gNB-CU has.

In step S1716, the gNB-CU transmits the gNB-CU Configuration Update message to the gNB-DU. For requesting change of beam(s) currently in use, the gNB-CU Configuration Update message may include a troubled beam indication indicating beam(s) that a connection failure happened. For removing beam(s) indicated by the beam related information received from the UE, the gNB-CU Configuration Update message may include a removed beam indication informing the gNB-DU that the beam(s) indicated by the beam related information is removed from a list of beams allocated by the gNB-DU. Each of the troubled beam indication or the removed beam indication may include the beam index(es) of the corresponding beam(s) and/or the beam related parameters. The gNB-CU Configuration Update message may be an existing message and/or may be replaced with a new message.

In step S1718, upon receiving the gNB-CU Configuration Update message including the troubled beam indication from the gNB-CU, the gNB-DU makes/generates a list of beams excluding the beam(s) indicated by the troubled beam indication and/or the list of beams which the gNB-DU newly allocates. Then, the gNB-DU transmits the gNB-CU Configuration Update Acknowledge message including the list of beams to the gNB-CU. The gNB-CU Configuration Update Acknowledge message may be an existing message and/or may be replaced with a new message.

Alternatively, upon receiving the gNB-CU Configuration Update message including the removed beam indication from the gNB-CU, the gNB-DU removes the beam(s) indicated by the removed beam indication from the list of beams which the gNB-DU allocated. Then, the gNB-DU may transmit the gNB-CU Configuration Update Acknowledge message to the gNB-CU. The gNB-CU Configuration Update Acknowledge message may be an existing message and/or may be replaced with a new message.

When or after receiving the gNB-CU Configuration Update Acknowledge message from the gNB-DU and/or transmitting the gNB-CU Configuration Update message including the removed beam indication to the gNB-DU, the gNB-CU may allocate beam to UEs within its coverage based on the received and/or modified list of beams. Then, the gNB-CU may transmit the allocated beam related information to UEs using the RRC message (e.g. RRCReconfiguration) via the gNB-DU.

According to an embodiment of the present invention shown in FIG. 17, if the gNB has CU-DU split architecture, the gNB-CU can know that the UEs experience RLF and can know information on beam(s) on which RLF happens. Therefore, the gNB-CU can reconstitute the beams which it serves through the signaling with the gNB-DU. So, RLF may be reduced and/or avoided. Therefore, UE's experience can be enhanced by detection of connection failures that occur due to RLF.

Furthermore, in all of the embodiments described above, RLF cell information may be transmitted together with the beam related information. The RLF cell information may include information on a cell at which the RLF happens.

The present invention may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 18:
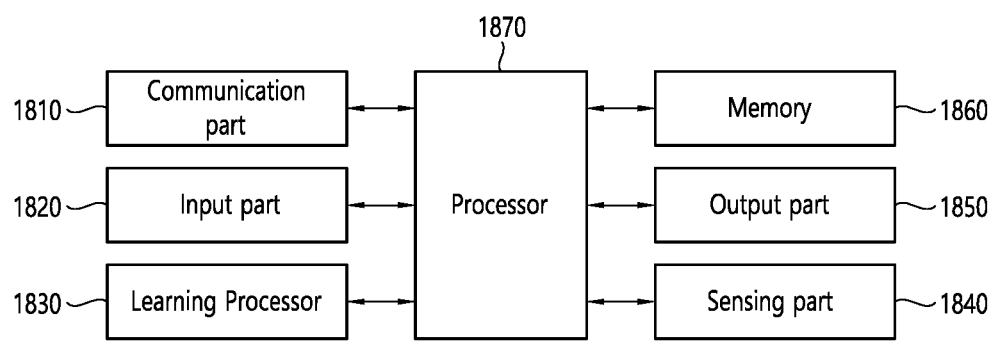
FIG. 18 shows an example of an AI device to which the technical features of the present invention can be applied.

FIG. 18 shows an example of an AI device to which the technical features of the present invention can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc. The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing. The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
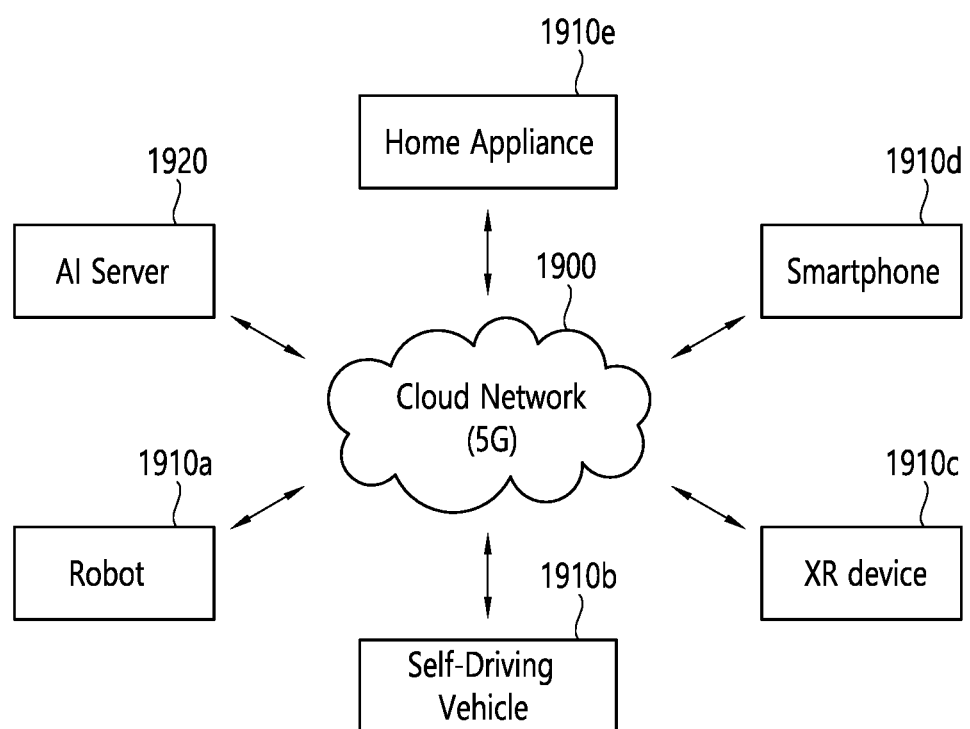
FIG. 19 shows an example of an AI system to which the technical features of the present invention can be applied.

FIG. 19 shows an example of an AI system to which the technical features of the present invention can be applied.

Referring to FIG. 19, in the AI system, at least one of an AI server 1920, a robot 1910*a*, an autonomous vehicle 1910*b*, an XR device 1910*c*, a smartphone 1910*d* and/or a home appliance 1910*e* is connected to a cloud network 1900. The robot 1910*a*, the autonomous vehicle 1910*b*, the XR device 1910*c*, the smartphone 1910*d*, and/or the home appliance 1910*e* to which the AI technology is applied may be referred to as AI devices 1910*a* to 1910*e*.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910*a* to 1910*e* and 1920 consisting the AI system may be connected to each other through the cloud network 1900. In particular, each of the devices 1910*a* to 1910*e* and 1920 may communicate with each other through a base station, but may directly communicate with each other without using a base station.

The AI server 1900 may include a server for performing AI processing and a server for performing operations on big data. The AI server 1900 is connected to at least one or more of AI devices constituting the AI system, i.e. the robot 1910*a*, the autonomous vehicle 1910*b*, the XR device 1910*c*, the smartphone 1910*d* and/or the home appliance 1910*e* through the cloud network 1900, and may assist at least some AI processing of the connected AI devices 1910*a* to 1910*e*. The AI server 1900 can learn the ANN according to the machine learning algorithm on behalf of the AI devices 1910*a* to 1910*e*, and can directly store the learning models and/or transmit them to the AI devices 1910*a* to 1910*e*. The AI server 1900 may receive the input data from the AI devices 1910*a* to 1910*e*, infer the result value with respect to the received input data using the learning model, generate a response and/or a control command based on the inferred result value, and transmit the generated data to the AI devices 1910*a* to 1910*e*. Alternatively, the AI devices 1910*a* to 1910*e* may directly infer a result value for the input data using a learning model, and generate a response and/or a control command based on the inferred result value.

Various embodiments of the AI devices 1910*a* to 1910*e* to which the technical features of the present invention can be applied will be described. The AI devices 1910*a* to 1910*e* shown in FIG. 19 can be seen as specific embodiments of the AI device 1800 shown in FIG. 18.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a gNB central unit (gNB-CU) operating in a wireless communication system, the method comprising:
   receiving, from a user equipment (UE) via a gNB distributed unit (gNB-DU), a first message including information on a beam for which a radio link failure (RLF) occurred; and
   transmitting, to the gNB-DU, a second message including information on the beam for which the RLF occurred,
   wherein the gNB-CU and the gNB-DU belongs to a same base station, and
   wherein the information on the beam for which the RLF occurred includes a removed beam indication indicating that the beam is removed from a list of beams allocated by the gNB-DU.

2. The method of claim 1, further comprising receiving, from the gNB-DU, a list of beams excluding the beam for which the RLF occurred.

3. The method of claim 1,
   wherein the first message is a UE Information Response Message.

4. A gNB central unit (gNB-CU) operating in a wireless communication system, the gNB-CU comprising:
   at least one processor; and
   at least one memory operably connectable to the at least one processor and storing instructions that, based on being executed by the at least one processor, perform operations comprising:
   receiving, from a user equipment (UE) via a gNB distributed unit (gNB-DU), a first message including information on a beam for which a radio link failure (RLF) occurred; and
   transmitting, to the gNB-DU, a second message including the information on the beam for which the RLF occurred,
   wherein the gNB-CU and the gNB-DU belongs to a same base station, and
   wherein the information on the beam for which the RLF occurred includes a removed beam indication indicating that the beam is removed from a list of beams allocated by the gNB-DU.

5. The gNB-CU of claim 4, wherein the operations further comprise receiving, from the gNB-DU, a list of beams excluding the beam for which the RLF occurred.

6. The gNB-CU of claim 4,
   wherein the first message is a UE Information Response Message.

* * * * *